US010102264B2

(12) United States Patent
Tung et al.

(10) Patent No.: US 10,102,264 B2
(45) Date of Patent: *Oct. 16, 2018

(54) DISTRIBUTED COMPUTING BACKUP AND RECOVERY SYSTEM

(71) Applicant: Accenture Global Services Limited, Dublin (IE)

(72) Inventors: Teresa Tung, San Jose, CA (US); Sameer Farooqui, San Jose, CA (US); Owen Richter, Santa Clara, CA (US)

(73) Assignee: Accenture Global Services Limited, Dublin (IE)

( * ) Notice: Subject to any disclaimer, the term of this patent is extended or adjusted under 35 U.S.C. 154(b) by 284 days.

This patent is subject to a terminal disclaimer.

(21) Appl. No.: 14/553,266

(22) Filed: Nov. 25, 2014

(65) Prior Publication Data
US 2015/0127982 A1    May 7, 2015

Related U.S. Application Data

(63) Continuation of application No. 13/250,901, filed on Sep. 30, 2011, now Pat. No. 8,930,320.

(51) Int. Cl.
*G06F 17/30* (2006.01)
*G06F 11/14* (2006.01)

(52) U.S. Cl.
CPC .... *G06F 17/30575* (2013.01); *G06F 11/1451* (2013.01); *G06F 11/1464* (2013.01); *G06F 11/1469* (2013.01)

(58) Field of Classification Search
CPC .......... G06F 17/30575; G06F 11/1451; G06F 11/1464; G06F 11/1469

USPC ........................................................ 707/654
See application file for complete search history.

(56) References Cited

U.S. PATENT DOCUMENTS

| 6,182,198 | B1 | 1/2001 | Hubis et al. |
| 6,434,681 | B1 | 8/2002 | Armangau |
| 6,745,191 | B2 | 6/2004 | Kasao et al. |
| 7,069,466 | B2 | 6/2006 | Trimmer et al. |

(Continued)

FOREIGN PATENT DOCUMENTS

WO     WO 2009/031156 A2     3/2009

OTHER PUBLICATIONS

Patent Examination Report No. 1 dated October 17, 2012 for co-pending Australian Patent Application No. 2012232945.

(Continued)

*Primary Examiner* — Miranda Le
(74) *Attorney, Agent, or Firm* — Brinks Gilson & Lione

(57) ABSTRACT

The distributed computing backup and recovery (DCBR) system and method provide backup and recovery for distributed computing models (e.g., NoSQL). The DCBR system extends the protections from server node-level failure and introduces persistence in time so that the evolving data set may be stored and recovered to a past point in time. The DCBR system, instead of performing backup and recovery for an entire dataset, may be configured to apply to a subset of data. Instead of keeping or recovering snapshots of the entire dataset which requires the entire cluster, the DCBR system identifies the particular nodes and/or archive files where the dataset resides so that backup or recovery may be done with a much smaller number of nodes.

11 Claims, 7 Drawing Sheets

(56) References Cited

U.S. PATENT DOCUMENTS

| | | | |
|---|---|---|---|
| 7,159,070 B2 * | 1/2007 | Kilian | H04L 45/7453 711/108 |
| 7,240,236 B2 * | 7/2007 | Cutts | G06F 11/1076 714/6.1 |
| 7,266,655 B1 * | 9/2007 | Escabi, II | G06F 11/1448 707/999.202 |
| 7,424,514 B2 * | 9/2008 | Noble | G06F 11/1464 709/205 |
| 7,660,983 B1 * | 2/2010 | Srivastava | H04L 9/0822 713/163 |
| 7,669,020 B1 * | 2/2010 | Shah | G06F 11/1458 711/162 |
| 7,738,466 B2 * | 6/2010 | Schwan | G06F 17/3033 370/395.32 |
| 7,779,128 B2 * | 8/2010 | Utard | G06F 11/1076 370/256 |
| 7,783,604 B1 | 8/2010 | Yueh | |
| 7,797,279 B1 | 9/2010 | Starling et al. | |
| 7,882,069 B2 * | 2/2011 | Glover | G06F 11/1451 707/640 |
| 7,921,080 B2 | 4/2011 | Taylor | |
| 7,925,624 B2 | 4/2011 | Vosshall et al. | |
| 8,015,211 B2 * | 9/2011 | Marceau | G06F 17/30067 380/277 |
| 8,024,306 B2 * | 9/2011 | Palliyil | H04L 67/2819 707/697 |
| 8,037,032 B2 | 10/2011 | Pershin et al. | |
| 8,051,205 B2 * | 11/2011 | Roy | G06F 15/16 709/238 |
| 8,095,751 B2 | 1/2012 | Garimella et al. | |
| 8,108,502 B2 * | 1/2012 | Tabbara | H04L 12/2602 709/203 |
| 8,117,410 B2 | 2/2012 | Lu et al. | |
| 8,185,554 B1 | 5/2012 | Auchmoody et al. | |
| 8,209,298 B1 * | 6/2012 | Anglin | G06F 11/1469 707/610 |
| 8,230,013 B2 * | 7/2012 | Daniels | H04L 69/08 709/204 |
| 8,275,826 B2 * | 9/2012 | Kakivaya | G06F 17/30067 709/201 |
| 8,341,127 B1 * | 12/2012 | Heithcock | G06F 17/30312 707/640 |
| 8,346,719 B2 * | 1/2013 | Sudhakar | G06F 17/30067 707/610 |
| 8,351,600 B2 * | 1/2013 | Resch | G06F 11/1004 380/28 |
| 8,392,482 B1 * | 3/2013 | McAlister | G06F 17/30584 707/771 |
| 8,458,299 B2 * | 6/2013 | Lin | G06F 17/30197 707/821 |
| 8,468,244 B2 | 6/2013 | Redlich et al. | |
| 8,478,726 B2 | 7/2013 | Habermann et al. | |
| 8,484,427 B1 * | 7/2013 | Goldobin | G06F 3/065 711/161 |
| 8,538,926 B2 * | 9/2013 | Barton | G06F 17/30575 707/652 |
| 8,595,188 B2 | 11/2013 | Gruhl et al. | |
| 8,595,190 B2 * | 11/2013 | Garza | G06F 17/30318 707/609 |
| 8,615,490 B1 * | 12/2013 | Platt | G06F 17/30135 707/640 |
| 8,621,182 B1 * | 12/2013 | Sorenson, III | H04L 67/1097 711/216 |
| 8,667,273 B1 * | 3/2014 | Billstrom | G06F 21/6209 713/165 |
| 8,712,966 B1 * | 4/2014 | Armorer | G06F 11/1461 707/645 |
| 9,021,112 B2 * | 4/2015 | Slocombe | H04L 29/06 709/229 |
| 9,075,809 B1 * | 7/2015 | Shah | G06F 17/30067 |
| 9,251,012 B2 * | 2/2016 | Barton | G06F 11/1464 |
| 2002/0107877 A1 * | 8/2002 | Whiting | G06F 11/1453 |
| 2003/0046260 A1 * | 3/2003 | Satyanarayanan | G06F 17/30106 |
| 2004/0177226 A1 | 9/2004 | Chen | |
| 2004/0225655 A1 | 11/2004 | Moulton | |
| 2005/0015413 A1 | 1/2005 | Teodosiu et al. | |
| 2005/0131961 A1 * | 6/2005 | Margolus | G06F 17/30097 |
| 2006/0242205 A1 * | 10/2006 | Schmidt | G06F 11/1451 |
| 2006/0253731 A1 | 11/2006 | Petruzzo | |
| 2006/0271530 A1 | 11/2006 | Bauer | |
| 2007/0136200 A1 * | 6/2007 | Frank | G06Q 10/10 705/50 |
| 2008/0065704 A1 * | 3/2008 | MacCormick | G06F 17/30215 |
| 2008/0195675 A1 * | 8/2008 | Torrent | G06F 11/1464 |
| 2008/0307020 A1 * | 12/2008 | Ko | G06F 11/1469 |
| 2009/0006640 A1 * | 1/2009 | Brouwer | G06F 11/10 709/231 |
| 2010/0023726 A1 | 1/2010 | Aviles | |
| 2010/0058013 A1 | 3/2010 | Gelson et al. | |
| 2010/0076934 A1 | 3/2010 | Pershin et al. | |
| 2010/0094921 A1 | 4/2010 | Roy et al. | |
| 2010/0169594 A1 | 7/2010 | Tsaur et al. | |
| 2010/0257403 A1 | 10/2010 | Virk et al. | |
| 2010/0262586 A1 | 10/2010 | Rosikiewicz et al. | |
| 2010/0332456 A1 * | 12/2010 | Prahlad | G06F 17/3002 707/664 |
| 2011/0078230 A1 | 3/2011 | Sepulveda | |
| 2011/0087640 A1 | 4/2011 | Dodd et al. | |
| 2011/0161293 A1 | 6/2011 | Vermeulen et al. | |
| 2011/0191300 A1 * | 8/2011 | Orenstein | G06F 17/30 707/646 |
| 2011/0218967 A1 | 9/2011 | Sliger et al. | |
| 2011/0246731 A1 | 10/2011 | Ninose et al. | |
| 2012/0011338 A1 * | 1/2012 | Kobayashi | G06F 11/1456 711/162 |
| 2012/0124306 A1 * | 5/2012 | Abercrombie | G06F 11/1461 711/162 |
| 2012/0191724 A1 * | 7/2012 | Tucek | G06F 17/30073 707/747 |

OTHER PUBLICATIONS

Extended European Search Report issued in corresponding European Patent Application No. 12186724.6 dated Feb. 5, 2013, 8 pages.

* cited by examiner

DISTRIBUTED COMPUTING BACKUP AND RECOVERY SYSTEM

CROSS-REFERENCE TO RELATED APPLICATIONS

This application is a continuation of U.S. patent application Ser. No. 13/250,901 (now U.S. Pat. No. 8,930,320), the entirety of which is hereby incorporated by reference herein.

1. TECHNICAL FIELD

The present description relates to identifying and managing the data to backup and restore based on user preferences. This description also relates to backing up and restoring a subset of data objects in a data set based on user preferences without backing up the entire data set.

2. BACKGROUND

With the advent of emerging data platforms (EDP), information technology (IT) backup and recovery functions are changing in ways that are not currently well understood. EDP technologies achieve read and write scale by leveraging a hash function that uniformly distributes a set of data across a number of server nodes. Replication which is currently built into most EDP technologies partially addresses backup requirements by protecting against node failures. Replication alone fails to render the idea of backup moot. Specifically the built-in replication within the EDP fails to address the persistence use-case for backup. Persistence and persisting refer to the availability of historic data rather than the fundamental reliability of data storage required by data storage systems. Datasets in the cloud environment are often extremely large. so regular and incremental backups require more storage and compute resources and more process coordination. Organizations' use of information technology (IT) and infrastructure computing resources are moving away from a static environment to a more dynamic and fluid computing environment. Traditionally, organizations' computing resources existed on fixed infrastructure owned by the organization and controlled directly by the organization. However, with the virtualization of computing resources, and shared computing environments (e.g., cloud computing), a computing resource consumer's application and computing service requests may reside on and use a variety of dynamic virtual systems and resources, and use any number of service providers to meet the users service-level agreements (SLAs).

Backups are performed for the purposes to provide availability to users or systems to access current "live" data, and the persistence to access data at a past point in time. Distributed architectures perform well regarding availability, so that at any time the data set with a replication factor is hosted across a number of servers. The user or another system may perform a read or write at any given time. Distributed architectures also do well regarding nodular failures such that when a server goes down the distributed architecture and replication factor recovers the data for that one server. Similarly, for zone failures (e.g., a data center goes down), a cluster may be arranged in a configuration distributed across multiple geographic zones to limit risk to server outages. Even so, backup for persisting data is not addressed by the replication built-in to distributed architectures. Instead, backup for persistence may be achieved by copying a snapshot of live data to on/off-site disk at regular intervals (e.g., 24 hr or weekly). Replication to persisted snapshots (e.g., via SAN) may reduce the needed storage in the EDP, but requires the need to restore or synchronize systems. Current snapshot mechanisms protect the dataset in its entirety, but fail to protect data subsets that may include user, project and/or specific file/objects. Backups are performed for at least two purposes: 1) availability, and 2) persistence.

Distributed architectures do not account for persistence such that the user may roll back to a particular point in time and selectively recover data without also recovering the entire data set. For example, rolling back the environment to see what the user's data looked like a week ago (e.g., a user profile may have been updated and the user desires to return to a previous known profile configuration). The known distributed architectures perform data restores of an entire EDP system in order to recover particular data (e.g., an individual user's profile data such as a favorites list) from a full data set.

Availability guarantees data access in event of equipment failure. Indeed, NoSQL replicates data across nodes which protects against server failure. However, out-of-the-box NoSQL does not account for site failures (e.g., NoSQL cluster was hosted in Amazon Web Services' US East region). NoSQL maintains the current state of data. Also although the NoSQL platform otherwise uses a traditional backup snapshot for backups and recovery, NoSQL does not take into account persistence of user data. The NoSQL platform does not take into account persistence in terms of when data is updated (e.g., overwritten) by a user, and the historical information does not persist.

SUMMARY

The distributed computing backup and recovery (DCBR) system includes a processor, a cluster of computing nodes in a computing environment, an interface controlled by the processor connected to a network in the computing environment, and a memory coupled to the processor. The memory includes a data object request received through the interface for a data object of a data set, and a hash function that is evaluated by the processor to determine where to store or locate the data object. The memory includes instructions executable by the processor that cause the processor to retrieve the data object, when the request is a request to retrieve the data object, and backup the data object, when the request is a request to backup the data object, where a copy of the data object is located on one or more of the nodes. The data object request includes a data object identifier and a time period, and a copy of the data object is located on one or more nodes. The DCBR system uses a backup log file that includes a backup record identifier corresponding to the data object request that the hash function uses to identify where in the computing environment the data object is stored. Replicas of the data object may be located on multiple nodes determined by the hash function. The DCBR system may return a preferred replica from the multiple replicas, where the preferred replica includes the most recent, and/or the most correct copy of the data object or a combination of both.

The preferred replica is the same as the one used during the live operations of the EDP. For example, in one instantiation each node has a unique identifier that may be input into the same hash function as the data objects. Then the preferred replica is the one associated with the output of the hash function when applied to the object identifier. When there are N redundant replicas, for example one method of assignment may map those replicas reside on the next N nodes on the ring of nodes formed by ordering the results of the hashed node identifiers from smallest to largest, and then defining the smallest result to fall after the largest result. For example, in another instantiation, there may be another set of assignment functions that map the domain of the hash function applied to data objects onto the set of nodes. In this mapping a data object is first applied to the hash function, and then the hash function output is applied to the assignment function to determine the preferred and the redundant nodes on which the data objects should be stored. In another example, replicas may not fall on subsequent nodes. In Swift, each "zone" has a separate ring, each ring has a separate set of nodes, and replicas are spread across zones so that each replica is assured to be on a separate node.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The DCBR system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
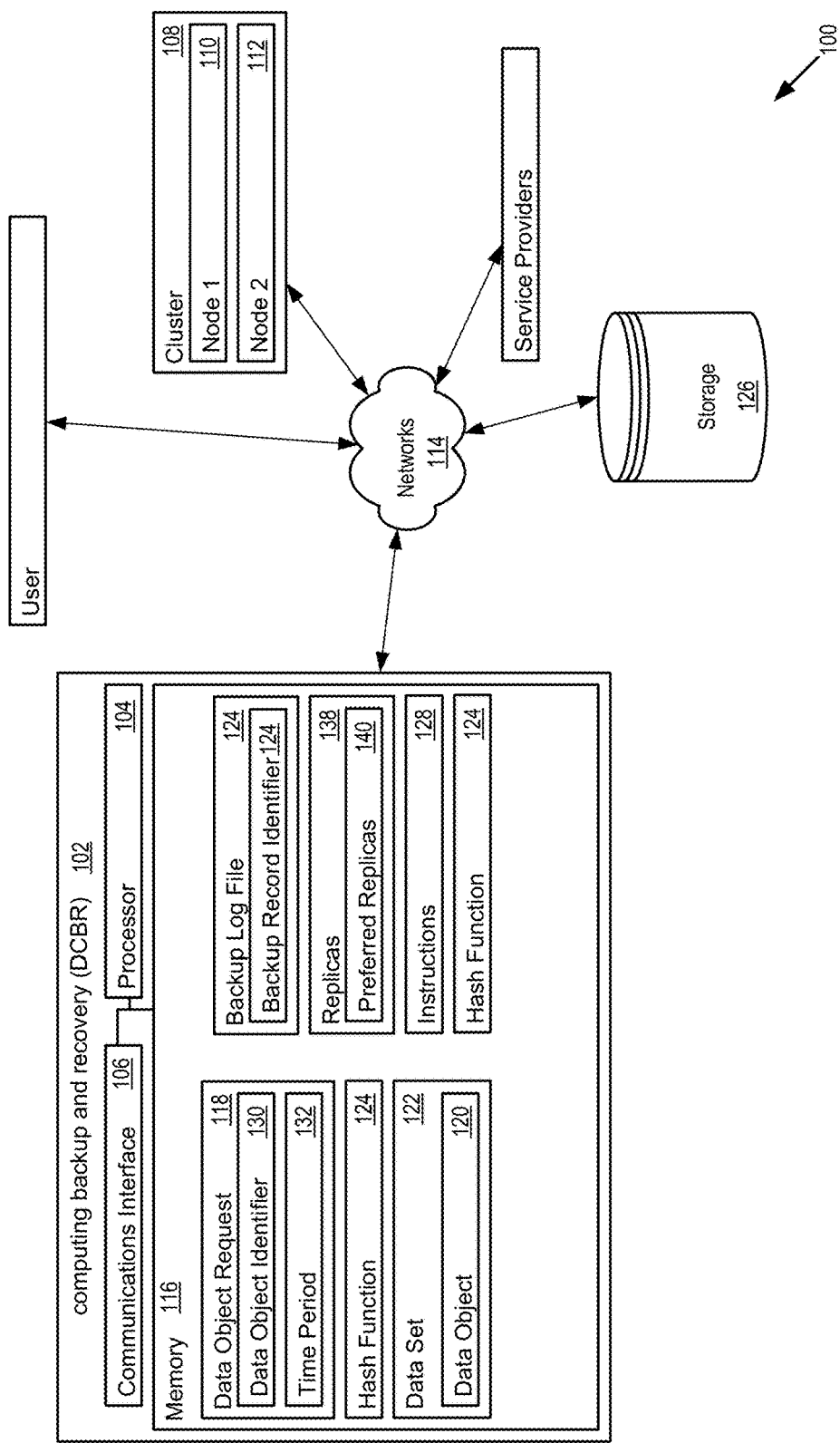
FIG. 1 shows a distributed computing backup and recovery (DCBR) configuration.

FIG. 1 shows the distributed computing backup and recovery (DCBR) configuration 100. The DCBR configuration 100 includes a distributed computing backup and recovery (DCBR) system 102 and for distributed computing models (e.g., NoSQL). The DCBR system 102 includes a processor 104, a communications interface 106, a cluster 108 of computing nodes 110, 112 in a computing environment, the communications interface 106 is controlled by the processor 104 connected to a network 114 in the computing environment, and a memory 116 coupled to the processor 104. The DCBR system 102 identifies nodes as typically the smallest compute or storage unit in a computing environment. Typically, when a node fails as a unit, the node is replaced as a unit (e.g., replacing a computer and/or a rack of computers, or replacing a virtual machine and/or a cluster of virtual machines). The memory 116 includes a data object request 118 received through the communications interface 106 for a data object 120 of a data set 122, and a hash function 124 that is evaluated by the processor 104 to determine a network storage location 126 or a network retrieval location, or both for the data object 120. The memory 116 includes instructions 128 executable by the processor 104 that cause the processor 104 to retrieve from the network retrieval location the data object 120, when the request is a request to retrieve the data object 120, and backup the data object 120, when the request is a request to backup the data object 120, where a copy of the data object 120 is located on one or more of the nodes 110, 112. The data object request 118 includes a data object identifier 130 and a time period 132 from which to retrieve the data object, and a copy of the data object 120 is located on one or more nodes. The DCBR system 102 uses a backup log file 134 that includes a backup record identifier 136 corresponding to the data object request that the hash function 124 uses to identify where in the computing environment the data object 120 is stored. Replicas 138 of the data object 120 may be located on multiple nodes 110, 112 that the hash function 124 determines. The DCBR system 102 may return a preferred replica 140 from the multiple replicas 138, where the preferred replica 140 includes selection criteria that include data freshness, and/or data correctness of the data object 120 or a combination of both.

The DCBR system 102 and method extend the protections provide by distributed architectures from server node-level failure, and provide data persistence so that an evolving data set may be archived, and specified data may be recovered to a specified past point in time. The DCBR system 102 may perform backup and recovery for a subset of data, according to user preferences. For example, the DCBR system 102 and method identifies the nodes and/or archive files where a specified data object resides so that the DCBR system 102 provides backups and/or recoveries using a much smaller number of nodes. The DCBR system 102 provides targeted backup and recovery using configurable hash functions available in distributed architectures such as NoSQL. The DCBR system 102 allows the user to back up particular data without backing up an entire data set (e.g., in terms of how the data appears in the cluster), and/or recover data at the granular level (e.g., a discrete data object).

Table 1 shows the current approach for backup/restore of data and/or subset of the data contained in the N-node cluster. The current approach does not leverage the distributed hash table (DHT) to backup and/or restore a subset of data (e.g., 3 nodes of N-nodes) the current approach requires restoring all N-nodes. Similarly, where the data desired to be backed up only resides on 1 snapshot, the current approach requires restoring snapshots for the entire N-node cluster.

TABLE 1

Current Approach to Backup and Recovery

Backup at time t
    Individually snapshot all N nodes
    Save collected snapshots of N nodes together and
    associate with time t
Restore to time t TABLE 1-continued Current Approach to Backup and Recovery Gather the collected snapshots of all N nodes
associated with time t
Restore entire cluster of N nodes The DCBR system 102 and method identifies where within the distributed compute-data platform a subset of data is stored, and may use the identification mechanism to track where a subset of data resides in past archives. Identification of where data resides in the distributed platform allows backup and/or recovery by the DCBR system 102 of those nodes that host the relevant data, instead of involving a backup and/or recovery of the entire cluster. The DCBR system 102 provides user configurable preferences that may result in 1) less archival storage used because only relevant nodes may be backed up, and 2) faster restores because a smaller set of clusters may be involved with a subset of data. Without the ability to recover user selectable (e.g., relevant) nodes, recovery includes the entire dataset in the primary cluster, or the container of an entire replica of the physical primary cluster for the purpose of hosting recovery efforts. In an embodiment, the DCBR system 102, given a specified data object, determines which nodes, and/or which stored images of nodes where the data object resides. The DCBR system 102 may orchestrate backup and recovery of the given data object using normal backup and archival techniques. The DCBR system 102 supports maintenance in terms of the backup and recovery of data associated with parallel distributed computing platforms that perform as super computers.

Distributed architectures are directed to addressing the technical problem of scaling to satisfy environments of hyper-sized numbers of nodes that manage large numbers of data read and write accesses. Distributed architectures include large clusters of nodes where the data is replicated distributed according to a configurable arrangement (e.g., one file mapped via a hash function (replicated) to one or multiple machines in the cluster). Most emerging data platform (EDP) solutions include at least 3 way replication of data by default, so that each copy of the data is copied two more times across different nodes. Each copy of a single piece of data is referred to as a replica. In the event the data somehow gets destroyed in one of the replicas, that replica is automatically replaced by a copy from another node.

Distributed architectures such as NoSQL leverage a distributed hash function for distributing the data. This distribution allows many parallel read and write accesses of data. The DCBR system 102 uses a hash function that is used to fulfill a request by mapping the request to a particular set of machines where the data to satisfy the request is located.

Figure 2:
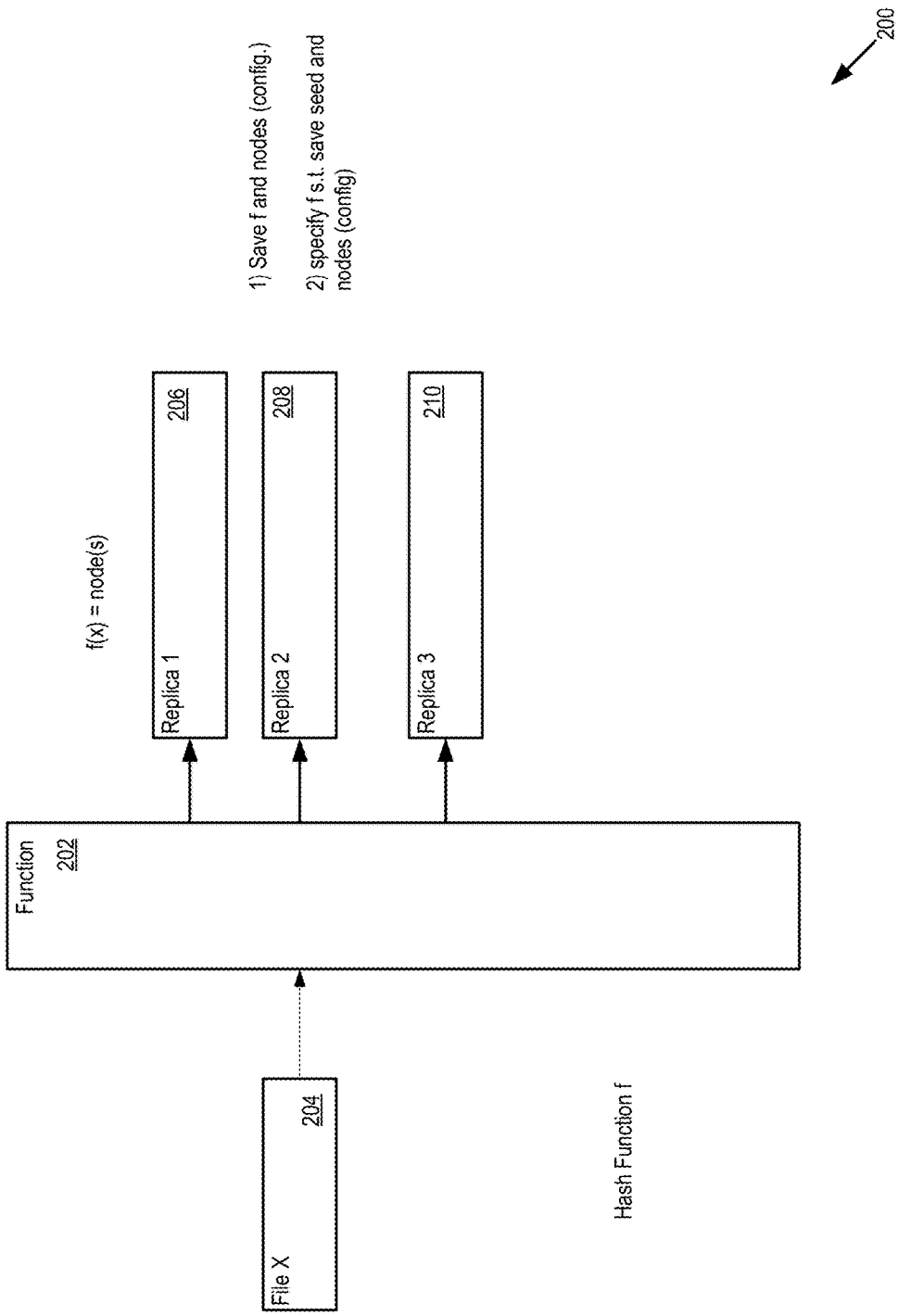
FIG. 2 shows an application of the hash function by the DCBR system.

FIG. 2 shows an application 200 of the hash function 202 by the DCBR system 102. For example, NoSQL configurations provide that when a request for a file 204 is received, because each node of the environment knows the node's hash function values, the request is directed to the particular server where the requested file is expected to be located. The DCBR system 102 may be configured to replicate data (replicas 206, 208, 210) across multiple nodes using the hash function to distribute the replicas. Subsequently, when the data is accessed from the multiple replicas. the DCBR system 102 uses the hash function to determine the preferred copy or uses the hash function to retrieve all the copies after which application logic chooses the preferred version of the data (e.g., the most recent, and/or the most correct copy and/or the majority value) to use to complete the request, and returns the appropriate data responsive to the request.

Table 2 describes the distributed hash table (DHT) used by distributed compute systems such as NoSQL and/or peer-to-peer networks.

TABLE 2

Distributed Hash Table

Object → Hash Function → Key that is uniformly distributed →
Map to the distributed network or cluster
    Pass the object ID through the hash function (e.g.,
    message-digest algorithm md5(object_ID)). Every node in
    the cluster uses the same hash function with the same
    seed so that the resulting hash is the same for the same
    object ID.
    Note that the object ID may sometimes refer to an object ID
    for a data object.
    A key is the result from the hash function. Note that the
    hash function uniformly distributes the keys in a space.
    Apply any function that maps the range of the hash ID to
    one of the nodes. One example mapping of the keys to the
    nodes is as follows:
        Order the node keys from smallest to largest.
        Assign previous and next based on the ordering,
        with the largest node key pointing to the smallest
        node key as the next, and then the smallest to the
        largest as the previous. This forms a ring.
        The object key for a data object also maps to a value
        in the ring. Assign the node(s) that are next in the
        sequence to the object. The assigned node(s) is
        where the object will be stored.

The DCBR system 102 leverages the hash function to provide a way to recover one or more subsets of data from an entire data set (e.g., the individual user's profile favorites from last week or the user's email settings from 2 days ago) without recovering the entire cluster or data set. The DCBR system 102 may be configured to back up the environment by taking a snapshot of the entire data set, and store the hash function configuration that identifies the servers in the environment. During recovery, the DCBR system 102 retrieves specified data (e.g., a customer's user profile from last week) by looking up the hash function associated with the data set for the specified time period (e.g., last week) and mapping the hash function to the server(s) where the user's profile data from last week resided, and recovers the particular snapshot of data for the requested user's profile from the node backups where it resided. The DCBR system 102 saves the hash function, the data at each node in terms of the snapshots (e.g., according to a cluster backup configuration), and a configuration file that maps the node backups to the appropriate hash function (e.g., the list of node identifiers that when input into the hash function returns a range for which each node is responsible, or another assignment function that maps the hash domain to particular nodes). The DCBR system 102 recovers just the particular server images on which the requested data resides. The DCBR system 102 then queries each of the servers to retrieve the requested data.

Table 3 shows an approach the DCBR system 102 may implement to backup a subset of data S.

TABLE 3

Backup a subset of data S.

Backup S at time t
    First compile a list of nodes to backup B. Initially B is
    empty (B = { }).
        For each object s in S

TABLE 3-continued

Backup a subset of data S.

Using the DHT*, lookup the set of nodes
{n(1), n(2), ..., n(k)} where s is stored.
Append this set of nodes {n(1), n(2), ...,
n(k)} to the list B.
Update B = union(B, {n(1), n(2), ...,
n(k)}).
Individually snapshot all nodes in B.
For example, referring to the assignment function
described in Table 2, the node key is associated with
the corresponding snapshot. Here the node key is
the output of the node ID from the hash function.
Node key and/or object key associations are stored
for respective assignment functions.
Save collected snapshots of N nodes together.
Associate this collection with time t.
Note that if S is the entire data set, that B is the entire
N-node cluster.
(As a variation, the hash function may be saved in a
separate file associated with the collection of
snapshots).

Figure 3:
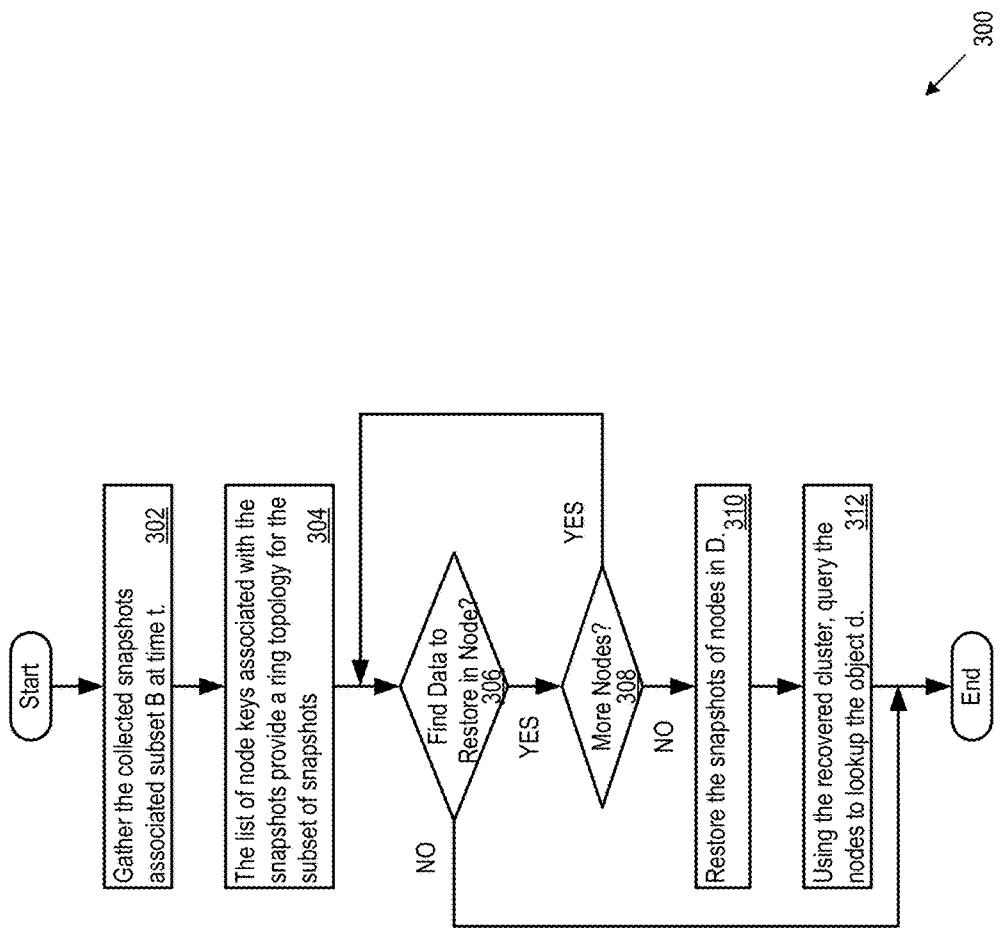
FIG. 3 shows logic flow the DCBR system may perform to restore a subset of data from a backup.

FIG. 3 shows logic 300 the DCBR system 102 may perform to restore a subset of data from a backup. The DCBR system 102 gathers the collected snapshots associated subset B at time t (302). The DCBR system 102 analyzes the list of node keys associated with the snapshots (304), and the list of nodes ordered by the output of the hash function applied to the node keys (with the smallest value assigned as next for the largest value) provide a ring topology for the subset of snapshots. Configurable assignment functions map the range of the hash to the nodes. For example, for values that the hash will return, the hash will assign one unique node for each of replicas. In the case of a primary and redundant replica, the assignment function may return one preferred node and one secondary node where the preferred node and secondary are not the same.

Alternatively, instead of a ring topology the DCBR system may use an assignment function that maps the objects to the appropriate nodes according to configurable criteria. The DCBR system 102 determines a list of nodes to restore R (306, 308, 310) where object d is stored, and restores the snapshots of nodes D (server images) found to include the data object d, and using the recovered cluster, the DCBR system 102 may query the nodes to lookup the object d (312).

Table 4 shows an approach the DCBR system 102 may implement to restore a subset of data (object d) from D.

TABLE 4

Restore a subset of data D

Restore to time t
  Gather the collected snapshots associated subset B
  at time t.
  Note that B can be the entire N-node cluster.
  The list of node keys associated with the snapshots
  provides the ring topology for the subset of
  snapshots (e.g., referring to the assignment
  mechanism described in Table 2). For a more
  general assignment function, the stored assignment
  function may be used.
  If the hash function is stored in a separate file,
  continue to the next step.
  If the hash function is available, restore any one of
  the snapshots associated with the collection. Use
  the hash function contained within.
  Compile a list of nodes to restore R. Initially R is
  empty (R = { }).
    For each object d in D

TABLE 4-continued

Restore a subset of data D

Using the DHT* and assignment
function, lookup the set of nodes {m(1),
m(2), ..., m(k)} where d is stored.
Append this set of nodes {m(1), m(2), ...,
m(k)} to the list D.
Update D = union(D, {m(1), m(2), ...,
m(k)}).
Restore the snapshots of nodes in D.
Using the recovered cluster, query the nodes to
lookup the object d.

The DCBR system 102 may alternatively and/or in combination with the previously described approach, save the node snapshots, and the configuration, but instead of saving the entire hash function, the DCBR system 102 specifies a hash function that is used throughout the running of the DCBR system 102, so that instead of saving the entire hash function, the DCBR system 102 saves a seed that is a random function based off of an initial seed that the DCBR system 102 stores and uses to recreate the hash function as the hash function varies in time.

The DCBR system 102 recovers just the particular server images on which the requested data resides. The DCBR system 102 then queries each of the servers to retrieve the requested data. The DCBR system 102 may specify a hash function that is used throughout the running of the environment, so that instead of saving the entire hash function, the DCBR system 102 saves a seed that is a random function based off of an initial seed that the DCBR system 102 stores and uses to recreate the hash function as the hash function may vary in time due to changes to the node configurations and assignments. The DCBR system 102 saves the node snapshots, and the configuration. When a user requests (e.g., recover) a particular data object, the DCBR system 102 uses the seed to recreate the hash function for the specified time to identify the location of the requested data object.

The DCBR system 102 may also provide user configurable options to selectively backup selected data and/or data objects. For example, in an environment of 100 nodes, where the user only desires to back up a particular subset of data the DCBR system 102 may selectively backup the subset of the nodes where the specified data resides. The DCBR system 102 provides a recovery capability so that for example for a backup of 100 nodes a hash function is used to identify the subset of server images to recover where the data is located among a subset of the 100 nodes, and then the DCBR system 102 queries the server images determined to be where the specified data resides without recovering the entire data set.

The DCBR system 102 allows the user to identify what to back up (e.g., in terms of snapshots) and what to restore at a granular level (e.g., data object, user selectable), rather than merely full data set backups and restores. The DCBR system 102 also provides a way to configure the clusters (e.g., in an environment that implements replication), where for example a hash function replicates the data multiple times the user may configure variations where one or more combination of replicas are backed up (e.g., 2 of 3 replicas are backup instead of all 3 replicas). The DCBR system 102 may determine which of one or more combinations of replicas to back up based on user configurable criteria that determine the quality and accuracy of each replica.

The DCBR system 102 may allow the user to selectively configure which replicas to back up for a given time. For example, the DCBR system 102 may use another hash function that sets up a set of servers (e.g., a staging area) to make a copy of the data, and a second and third copy of the data distributed on another partition of servers (e.g., 99 servers where 33 servers have one copy of the data, and the other 66 servers store the other two replicas together).

As described above, a restore of a sizable number of files will result in the restoration of a large number of nodes, but will still be able to eliminate replicas for the restore, thus saving space. In a further refinement, however, the backed up files may be restored in a serial fashion (e.g., one node after the other with the appropriate files being re-injected through the API), thus reducing the amount of resources required for the restore process. The DCBR system 102 may analyze the nodes to be restored and implement various approaches to serially and/or concurrently restore the nodes. For example, the nodes may be restored based on the amount of data to restore from each node (e.g., highest to lowest or vice versa). The number of nodes restored concurrently and/or the sequence that nodes may be restored may be configurable based on available resources (e.g., available nodes).

The DCBR system 102 also provides a configurable option to record all activities occurring during a backup. When the DCBR system 102 initiates a backup, the DCBR system 102 also may record all interactions (e.g., write access activities) during the backup to capture data changes that occur during the backup, and provide a finer level of consistency regarding the backup and the actual state of the environment at the time of the backup.

Figure 4:
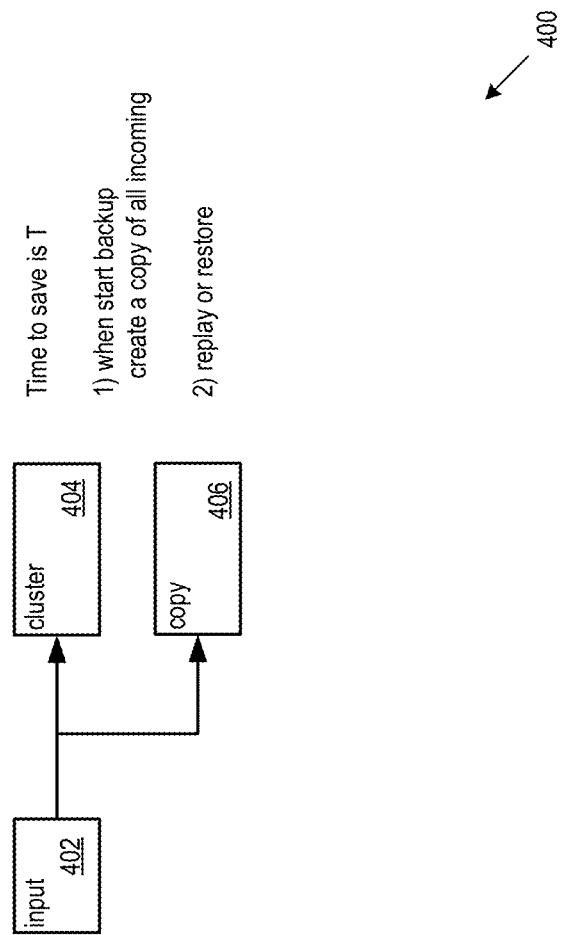
FIG. 4 shows how the DCBR system 102 is responsive to updates that might occur during the back-up process.

FIG. 4 shows an approach 400 the DCBR system 102 may use to manage updates that may occur during the back-up process. The time to snapshot all the instances is not instantaneous and may not happen in parallel. From the time the process starts (t(0)) until the process finishes (t=t(0)+T where T is the duration of the snapshot process), new arrivals or updates 402 may occur. The DCBR system 102 captures the updates and arrivals 402 when the DCBR system 102 starts the backup process, and records incoming requests with time-stamps to the N-node cluster 404. Either prior to completing backup or upon restore, the DCBR system 102 filters the events in the record to those that belong to the subset of B nodes (e.g., backed up nodes). The DCBR system 102 saves the record along with the collection of snapshots associated with time t. When the DCBR system 102 restores data to a time t, the DCBR system 102 completes the process as described above with the collection of snapshots and records associated with the time t, accesses the record and filters the events in the record that belong to the recovered R nodes (e.g., restored nodes). The DCBR system 102 plays the incoming requests up to time t (e.g., update requests will update the data in the recovered nodes).

In another example, backing up a cluster of 10 nodes, by the time the backup completes for the 10th node (e.g., backing up one node at a time serially) additional data and/or activity may have occurred on node 1 that may be backed up by the DCBR system 102. The DCBR system 102 may create a copy of all inputs (data writes—creating replicas of the newly arriving data) occurring during a backup to ensure consistency (e.g., copy a data stream from the network during the backup) and store the stream in another location (e.g., other than the location being backed up). During a recovery of the backup, the DCBR system 102 recovers the data set backed up, and plays back the data stream that was copied during the backup to provide a consistent restore. The DCBR system 102 starts a back up and a recording of data writes during the backup, and uses both the backup and the recording to perform a restore. The DCBR system 102 may also start recording in advance of a backup, and record and store data in a staging area, before backing up the data in some other location or medium (e.g., persistent CD-ROM or tape).

The DCBR system 102 provides a way to ensure consistency when backing up a large number of machines in a asynchronous manner. The DCBR system 102 may copy the data to be backed up to a set of clusters, play the recording to record the data writes occurring during the backup, and create a snapshot of the set of clusters and the recorded data writes.

The DCBR system 102 provides a way for users to selectively target what data to back up and what data to restore. The DCBR system 102 may be configured for multiple users sharing the environment and who have different priorities and different service level agreements (SLA), and dependent on different types of data from the shared environment. The DCBR system 102 allows users to configure the user's preferences for data to backup (e.g., store) and recover. In this way the DCBR system 102 determines the data to back up and the data to persist.

The DCBR system 102 also provides a way to configure a disaster recovery (DR) subset of nodes in different data centers. The DCBR system 102 may determine how to partition the way objects or files are stored and distributed to efficiently to take a snapshot of a subset of a cluster (e.g., a cluster with a single replica of the data versus the entire cluster).

When the DCBR system 102 receives the request for a file (e.g., a data, object such as a record a user would like to retrieve) at a specified time (e.g., last week at 2:30 PM), the DCBR system 102 looks up a record identifier in a backup log and/or configuration file for the backup record for the specified time (e.g., last week at 2:30 PM) and inputs the record identifier into a hash function, and the hash function outputs the corresponding server images where the requested data was recorded (located, and/or stored). The DCBR system 102 queries the server images for the requested data and restores the appropriate data (e.g., most accurate, and/or most current) based on user selectable preferences.

When the DCBR system 102 receives a request for data (e.g., data object) for a particular time when the data did not actually exist (e.g., a user request data or time period when the user was not a member), the DCBR system 102 may input the record identifier and the time period of interest for the non-existent data into the hash function, and the hash function may responsively output corresponding server images where the requested data would have been recorded had the data existed. The DCBR system 102 may return a status message when the data did not actually exist indicating that for the time period of interest the object (data) did not exist.

The DCBR system 102 may intercept data (e.g., write accesses) at the API level to manage targeted backups and recoveries. The DCBR system 102 API interfaces with various types of databases (e.g., traditional database, relational, and/or NoSQL platform). The DCBR system 102 API identifies database resources as a data service to use to read/write data from/to one or more service providers. The DCBR system 102 API provides control over the distribution of the data backup to one or more service providers (e.g., data service) to provide security and backup reliability (e.g., backup distributed to multiple service providers according to any number of combinations, including a Redundant Array of Independent Disks—RAID approach). For example, the DCBR system 102 API allows the user to stripe the data backup across multiple service providers, and various other combinations and/or arrangements of multiple service providers. In another example, the DCBR system 102 API may strengthen security by encrypting the data and distributing segments to respected service providers for backup so that not only is the data encrypted but each of the service providers back up a portion of the encrypted data.

Figure 5:
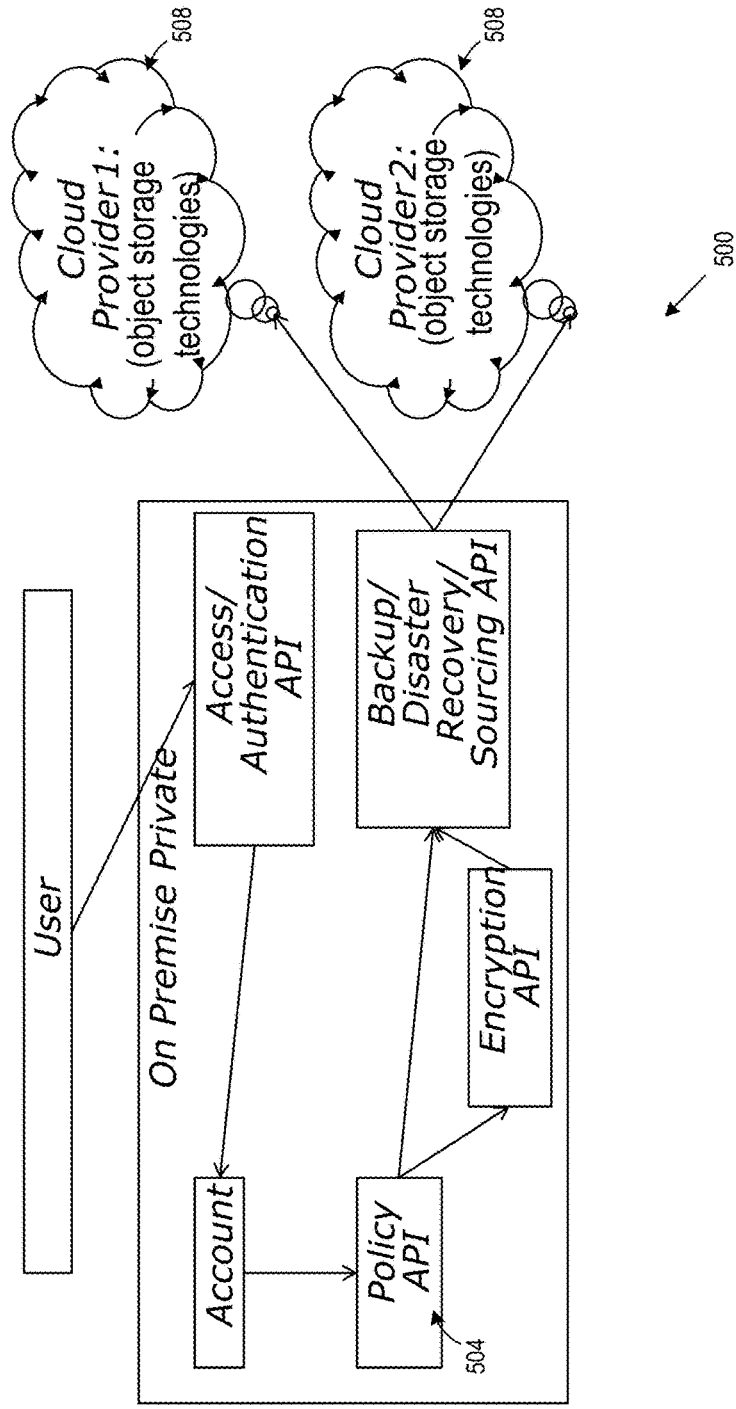
FIG. 5 shows a backup configuration using cloud application programming interfaces (API).

FIG. 5 shows a backup and recovery configuration 500 that uses cloud APIs to build fail over, disaster recovery, and data persistence into the cloud infrastructure. The DCBR system 102 makes backup a part of the application layer, and makes backup and recovery self-service for users.

Figure 6:
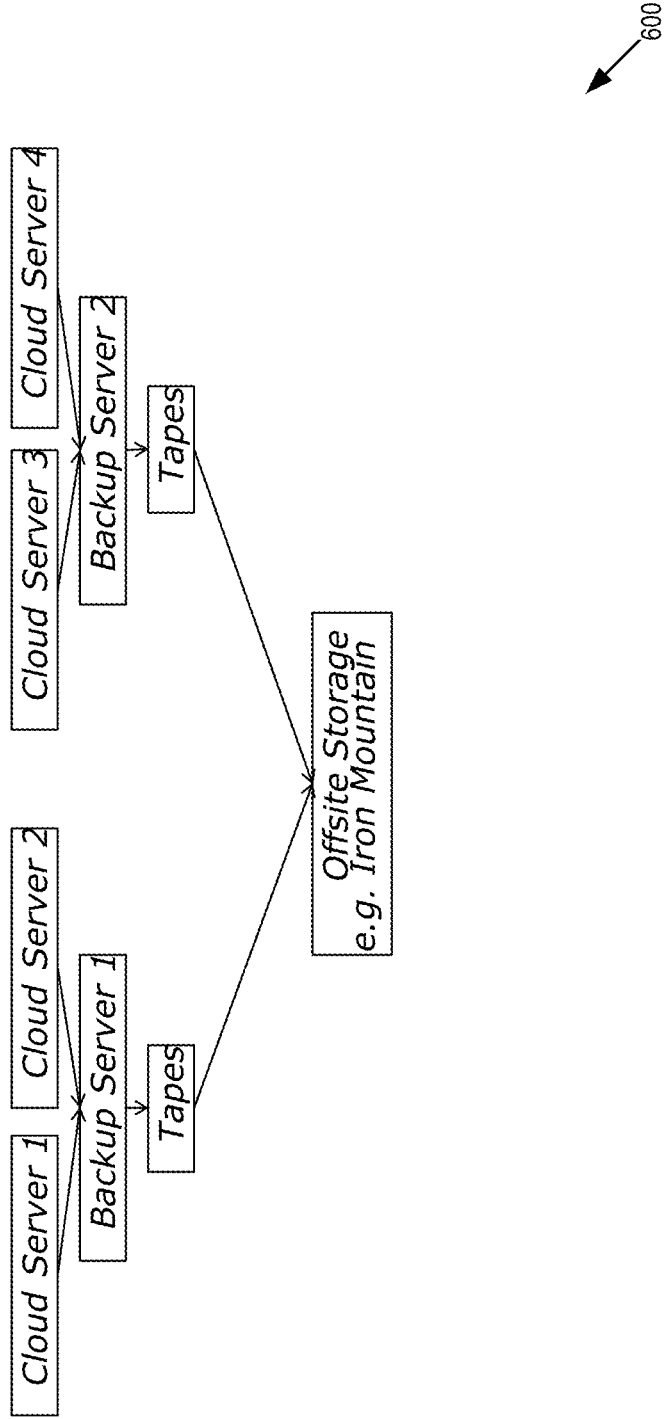
FIG. 6 shows a conventional backup and restore configuration.

FIG. 6 shows a conventional backup configuration 600 using servers running cloud services such as object storage or NoSQL databases (the Swift™ database or the Cassandra™ database). Storage of small numbers of large files such as tape archive files is ideally suited to object storage technologies. Backups and recovery configurations in the cloud environment include the use of open source backup solutions, where tapes are often virtual resources. Backups may contain as many replicas as the replication level of the underlying data system, making the backups inefficient. A separate replica disaster recovery zone in some applications may be setup. The DCBR system 102 may provide users backups and recovery capabilities implemented in the application layer using the cloud APIs. For example, for a cloud computing platform (e.g., Swift™, Cassandra™) where all of the objects stored in Swift™ are stored directly on the file system, the DCBR system 102 may use an API for Swift™ in order to find the objects in the backup archive. When the DCBR system 102 identifies where the appropriate files to restore are stored, the files may be recovered from tape (e.g., storage), and re-injected through the API. The emergence of a growing number of non-relational, distributed data stores often do not attempt to provide ACID (atomicity, consistency, isolation, durability) guarantees, which are the key attributes of classic relational database systems. Moderately sized installations may use Swift™, but such a solution may become unmanageable for hyper scale installations. Swift™ is an object storage system built for storing large amounts of data cheaply and efficiently, similar to S3. Swift™ was designed for high availability, even data storage distribution and redundant data storage. Swift™ is not a database and is not a block-level storage system. Swift™ is an object storage system which stores data directly on a file system using a hash ring for addressing.

Figure 7:
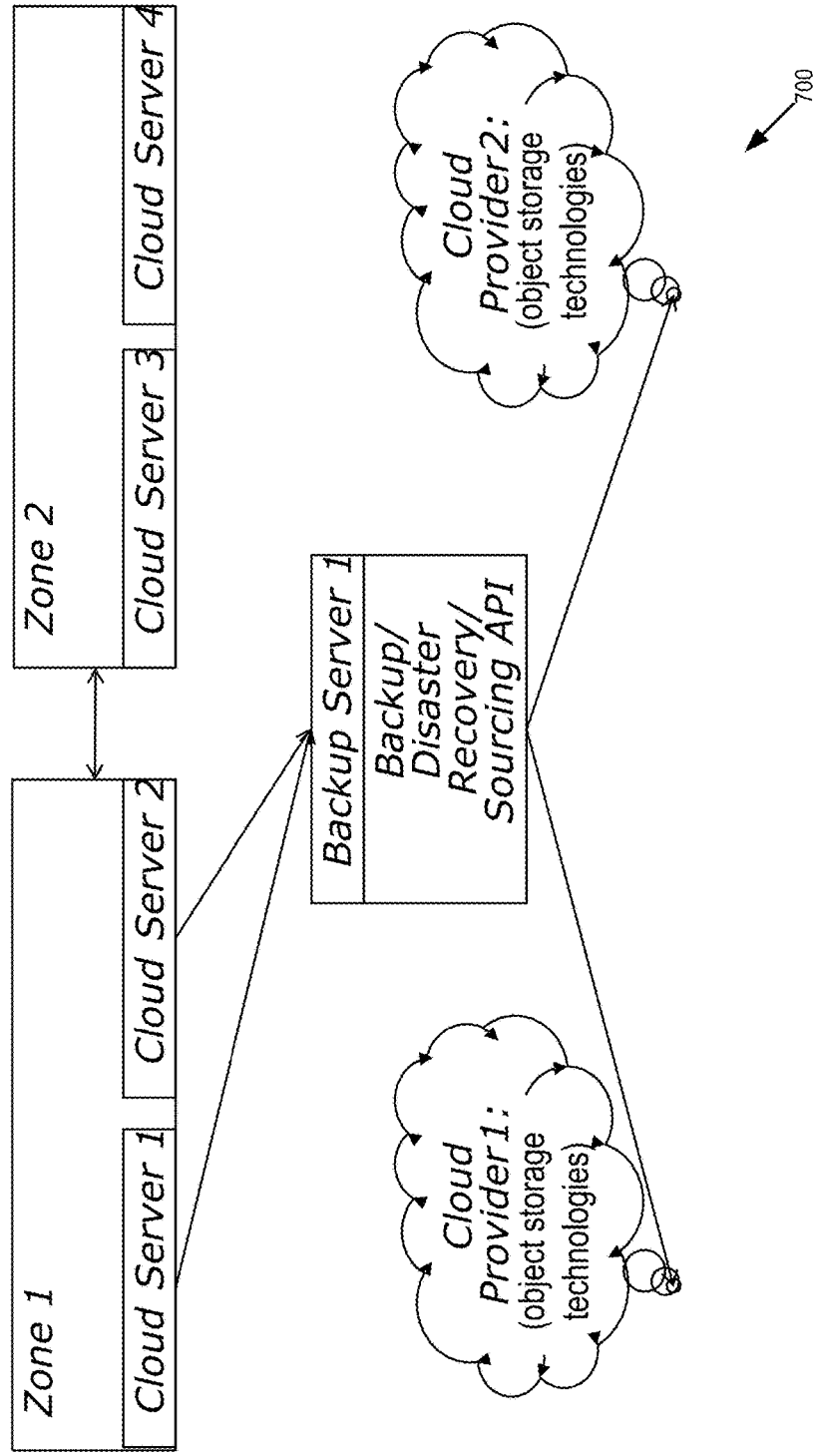
FIG. 7 shows another configuration of a conventional backup and restore.

FIG. 7 shows another configuration of a conventional backup and restore. The DCBR system 102 identifies regions as geographically distinct areas (e.g., a hurricane knocking out power to an entire region) configured to prevent one region from being affected as another region. The DCBR system 102 identifies zones as independent hardware (e.g., different LAN subnets, different hard drives, or different data centers), and when hardware fails in one zone, the configuration is responsive to the failure in the one zone independent of another zone. Storage setups with redundant storage typically enforce replication across zones so that one hardware zone failure does not destroy any data.

The DCBR system 102 uses hash rings that map one namespace into an evenly distributed second (e.g., typically smaller) namespace using a mathematical hashing function. The second namespace is used to distribute the first namespace across nodes. For example, the files named 'Alex' and 'Alexa' would be right next to each other in the namespace of all words, but may be separated in an evenly hashed namespace. Alternatively, the hash function uniformly randomizes the object IDs into a namespace, and a second assignment function distributes the output of the node keys (the hashed node IDs) to the server-nodes.

The DCBR system 102 may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor, such as, a central processing unit (CPU), a graphics processing unit (CPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method for distributed computing backup and recovery, comprising:
   retrieving a user selectable preference;
   identifying a first subset of data from within a data set according to at least one user selectable preference, the first subset of data comprising less than all of the data in the data set, and wherein the first subset is selectable by the user selectable preference;
   intercepting the first subset of data at an application programming interface (API);
   encrypting, by the API, at least a portion of the first subset of data into encrypted data objects that comprise a second subset of data that is less than all of the data in the first subset of data;
   receiving, into a memory via an interface controlled by a processor connected to a network in a computing environment, the second subset of data;
   evaluating, using the processor, a hash function stored in the memory to determine network storage locations or network retrieval locations, or both, for the encrypted data objects;
   storing, at a granular level that is less than all the data in the data set, multiple replica sets of the encrypted data objects across a plurality of different storage nodes included in the network storage locations according to the hash function, wherein each replica set of the encrypted data objects is stored across a respective cluster group of storage nodes from within the plurality of different storage nodes, and wherein the encrypted data objects stored across the plurality of different storage nodes are identified as replicas of data in the data set;
   retrieving, from the multiple replica sets of the encrypted data sets stored across their respective cluster groups of storage nodes, a preferred replica set of the encrypted data objects stored on a preferred cluster group of storage nodes in the network retrieval locations according to the hash function and an additional selection criteria including data freshness of the preferred replica set of the encrypted data objects, wherein the storage nodes comprising the preferred cluster group share the same hash function, and wherein data freshness includes a storage time of a respective encrypted data object;
   determining a hash seed used to recreate the hash function for an identified time and storing the hash seed for an identified time, at the plurality of different storage nodes included in the network storage locations,
      wherein the hash seed for the identified time is used to recreate the hash function for the identified time;
      wherein the hash seed is a random function based on an initial seed; and
   when a data object request comprises a request to store the encrypted data objects, recording write accesses that occur in the computing environment until the encrypted data objects are stored; and
   when the data object request comprises a request to retrieve the encrypted data objects, playing back the recording of write accesses until a restore completes.

2. The method of claim 1, wherein retrieving further comprises:
   determining a plurality of configurable restore options, the restore options including:
   a sequence of a plurality of nodes to restore including one or more nodes from which to granularly retrieve a copy of the encrypted data objects; or
   restore nodes to use to restore the encrypted data objects concurrently; or
   a combination thereof.

3. The method of claim 1, wherein the hash function uses a hash ring to map a first namespace into an evenly distributed second namespace using a hashing function wherein the evenly distributed second namespace is smaller than the first namespace.

4. The method of claim 3, wherein the second namespace is used to distribute the first namespace across nodes in the computing environment.

5. The method of claim 1, wherein, after intercepting the first subset of data at the API, the method further comprises:
   controlling distribution of the first subset of data through the API by interfacing with a database.

6. The method of claim 1, wherein encrypting the first subset of data by using the API further comprises:
   backing up a portion of the encrypted first subset of data.

7. A computer program product for distributed computing backup and recovery, comprising:
   a non-transitory computer readable memory with processor executable instructions stored thereon, wherein the instructions when executed by the processor cause the processor to:
   retrieve a user selectable preference;
   identify a first subset of data from within a data set according to at least one user selectable preference, the first subset of data comprising less than all of the data in the data set, and wherein the first subset is selectable by the user selectable preference;
   intercept the first subset of data at an application programming interface (API);
   encrypt, by the API, at least a portion of the first subset of data into encrypted data objects that comprise a second subset of data that is less than all of the data in the first subset of data;
   receive, into a memory via an interface controlled by a processor connected to a network in a computing environment;
   evaluate, using the processor, a hash function stored in the memory to determine network storage locations or network retrieval locations, or both, for the encrypted data objects;
   store, at a granular level that is less than all the data in the data set, multiple replica sets of the encrypted data objects across a plurality of different storage nodes included in the network storage locations according to the hash function, wherein each replica set of the encrypted data objects is stored across a respective cluster group of storage nodes from within the plurality of different storage nodes, and wherein the encrypted data objects stored across the different storage nodes are identified as replicas of data in the data set;

retrieve, from the multiple replica sets of the encrypted data sets stored across their respective cluster groups of storage nodes, a preferred replica set of the encrypted data objects stored on a preferred cluster group of storage nodes in the network retrieval locations according to the hash function and an additional selection criteria including data freshness of the preferred replica set of the encrypted data objects, wherein the storage nodes comprising the preferred cluster group share the same hash function, and wherein data freshness includes a storage time of a respective encrypted data object;

determine a hash seed used to recreate the hash function for an identified time and store the hash seed for an identified time, at the plurality of different storage nodes included in the network storage locations;

wherein the hash seed for the identified time is used to recreate the hash function for the identified time, wherein the hash seed is a random function based on an initial seed;

record write accesses that occur in the computing environment until the encrypted data objects are stored, when a data object request is a request to store the encrypted data objects; and play back the recording of write accesses until a restore completes, when the data object request is a request to retrieve the encrypted data objects.

8. The computer program product of claim 7, the instructions when executed by the processor further cause the processor to determine a plurality of configurable restore options, the restore options including:

a sequence of a plurality of nodes to restore including one or more nodes from which to granularly retrieve a copy of the encrypted data objects; or restore nodes to use to restore the encrypted data objects concurrently; or a combination thereof.

9. A system for distributed computing backup and recovery (DCBR), comprising:

a processor configured to retrieve a user selectable preference, identify a first subset of data from within a data set according to at least one user selectable preference, the first subset of data comprising less than all of the data in the data set, and wherein the first subset is selectable by the user selectable preference;

an application programming interface (API) configured to intercept the first subset of data, and encrypt the first subset of data;

a cluster of computing nodes in a computing environment;

an interface controlled by the processor connected to a network in the computing environment;

a memory coupled to the processor, wherein the memory comprises:

a data object request received through the interface for encrypted data objects wherein the encrypted data objects are encrypted and comprise a second subset of data that is less than all of the data in the first subset of data;

a hash function evaluated by the processor to determine network storage locations or network retrieval locations, or both, for the encrypted data objects;

instructions executable by the processor that cause the processor to:

store, at a granular level that is less than all the data in the data set, multiple replica sets of the encrypted data objects across a plurality of different storage nodes included in the network storage locations according to the hash function, wherein each replica set of the encrypted data objects is stored across a respective cluster group of storage nodes from within the plurality of different storage nodes, and wherein the encrypted data objects stored across the different storage nodes are identified as replicas of data in the data set; and retrieve, from the multiple replica sets of the encrypted data sets stored across their respective cluster groups of storage nodes, a preferred replica set of the encrypted data objects stored on a preferred cluster group of storage nodes in the network retrieval locations according to the hash function and an additional selection criteria including data freshness of the preferred replica set of the encrypted data objects, wherein the storage nodes comprising the preferred cluster group share the same hash function, and wherein data freshness includes a storage time of a respective encrypted data object;

determine a hash seed used to recreate the hash function for an identified time and store the hash seed for an identified time, at the plurality of different storage nodes included in the network storage locations;

wherein the hash seed for the identified time is used to recreate the hash function for the identified time, wherein the hash seed is a random function based on an initial seed;

record write accesses that occur in the computing environment until the encrypted data objects are stored, when the data object request is a request to store the encrypted data objects; and play back the recording of write accesses until a restore completes, when the data object request is a request to retrieve the encrypted data objects.

10. The system of claim 9, wherein the memory further comprises:

a backup log file that includes a backup record identifier corresponding to the preferred replica set of the encrypted data objects.

11. The system of claim 9, wherein the instructions further cause the processor to execute restore options, the restore options including:

a sequence of a plurality of nodes to restore including the one or more nodes from which to granularly retrieve a copy of the encrypted data objects; or restore nodes to use to restore the encrypted data objects concurrently; or a combination thereof.

\* \* \* \* \*